United States Patent
Park et al.

(10) Patent No.: US 8,060,158 B2
(45) Date of Patent: Nov. 15, 2011

(54) HINGE APPARATUS FOR PORTABLE TERMINAL

(75) Inventors: Duck-Bae Park, Suwon-si (KR);
Seung-Hoon Lee, Seoul (KR);
Kwang-Ho Jung, Suwon-si (KR);
Seung-Woo Lim, Seoul (KR);
Yong-Whi Lee, Seoul (KR)

(73) Assignee: Samsung Electronics Co., Ltd (KR)

( * ) Notice: Subject to any disclaimer, the term of this patent is extended or adjusted under 35 U.S.C. 154(b) by 875 days.

(21) Appl. No.: 11/857,185

(22) Filed: Sep. 18, 2007

(65) Prior Publication Data

US 2008/0070643 A1 Mar. 20, 2008

(30) Foreign Application Priority Data

Sep. 18, 2006 (KR) .................. 10-2006-0090188

(51) Int. Cl.
*H04M 1/00* (2006.01)
(52) U.S. Cl. ............... 455/575.3; 455/550.1; 455/575.1
(58) Field of Classification Search ............... 455/550.1, 455/575.1, 575.3
See application file for complete search history.

(56) References Cited

U.S. PATENT DOCUMENTS

| | | | | | |
|---|---|---|---|---|---|
| 5,278,993 | A | * | 1/1994 | Reiff et al. | 455/575.3 |
| 6,256,481 | B1 | * | 7/2001 | Jeong et al. | 455/575.3 |
| 6,292,980 | B1 | | 9/2001 | Yi et al. | |
| 2004/0142735 | A1 | * | 7/2004 | Yi | 455/575.3 |

FOREIGN PATENT DOCUMENTS

| | | | |
|---|---|---|---|
| JP | 2006-186501 | * | 7/2006 |
| KR | 1020020050802 | * | 6/2002 |
| KR | 1020030062624 | * | 7/2003 |
| KR | 1020060068492 | * | 6/2006 |
| KR | 1020060075409 | * | 7/2006 |

* cited by examiner

*Primary Examiner* — Charles Appiah
*Assistant Examiner* — William F Rideout
(74) *Attorney, Agent, or Firm* — The Farrell Law Firm, P.C.

(57) ABSTRACT

A hinge apparatus for a portable terminal including a first housing, and a second housing rotatably connected to the first housing, includes a first connection terminal mounted on the first housing; a second connection terminal mounted on the second housing; and a connection member straightly reciprocating between the first and second connection terminals while the second housing rotates with an electric connection with the second connection terminal, wherein the connection member makes contact with the first connection terminal when the second housing is folded to the first housing with facing the first housing, and the connection member also moves in a direction of being spaced apart from and withdrawing from the first connection terminal when the second housing rotates in a direction of withdrawing from the first housing.

12 Claims, 4 Drawing Sheets

HINGE APPARATUS FOR PORTABLE TERMINAL

PRIORITY

This application claims priority to an application filed with the Korean Intellectual Property Office on Sep. 18, 2006 and assigned Serial No. 2006-90188, the contents of which are incorporated herein by reference.

BACKGROUND OF THE INVENTION

1. Field of the Invention

The present invention relates to a portable terminal, and more particularly to a hinge apparatus for a portable terminal, which can couple a pair of housings to each other, thereby allowing one of the housings to rotate in a direction of approaching or withdrawing from the other housing while they face each other.

2. Description of the Related Art

In general, portable terminals may be classified into various types according to their appearance, such as a bar-type portable terminal, a flip-type portable terminal, and a folder-type portable terminal.

The bar-type portable terminal has a single body housing on which a data input/output unit, a transmitter, and a receiver are mounted. A keypad used as the data input/output unit always is exposed to the outside and may result in the malfunction thereof. Further, there is limitation in the miniaturization of the portable terminal because it is difficult to secure a sufficient distance between the transmitter and receiver.

The flip-type portable terminal has a body, a flip, and a hinge module for connecting the flip to the body. The body includes a data input/output unit, a transmitter, and a receiver mounted thereon. The flip covers the keypad used as the data input unit so as to prevent the malfunction of the keypad. However, there is also a limitation in the miniaturization of the flip type portable terminal because it is difficult to secure a sufficient distance between the transmitter and the receiver.

The folder-type portable terminal includes a body, a folder, and a hinge apparatus for rotatably connecting the folder to the body, in which the folder rotates to open and close the body. In a communication-standby mode in which the folder is closed over the body, it is possible to prevent the malfunction of the keypad. In a communication mode, as a transmitter and a receiver are arranged on the body and the folder, respectively, it is possible to secure a sufficient distance between the transmitter and the receiver. Thus, there is an advantage of miniaturizing the portable terminal.

U.S. Pat. No. 6,292,980 discloses a hinge apparatus for a portable terminal as described above. The principle of the hinge apparatus disclosed in the U.S. patent is that a hinge cam having mountain-shaped portions and valley-shaped portions, a hinge shaft, and a coil spring enabling the hinge cam to be in close contact with the hinge shaft are received in a hinge housing, thereby opening and closing a folder or a flip using curved surfaces of the mountain-shaped and valley-shaped portions and the elasticity of the coil spring.

Further, such a flip-type or folder-type portable terminal detects the opening and closed states of the flip or folder. As a result, the portable terminal interrupts operation of input/output units such as a keypad, a transmitter, a receiver, and a display unit, etc when the flip or folder is closed. conversely, the portable terminal activates the input/output units to allow voice communication, wireless access to Internet, and data input, etc, when the flip or folder is open.

Meanwhile, in the conventional art, a hall sensor has been used as means for detecting the opening and closed states of the flip or folder. The hall sensor is a magnetic sensor in which resistance varies according to the change of magnetic field. When the portable terminal is open, the hall sensor is located far from a magnetic body, and detects the change of magnetic force so as to interrupt or activate the operation of the input/output units.

However, since the conventional portable terminals have separate detection means, such as a hall sensor, in order to detect the opening and closed states of the flip or folder, an internal circuit has a complicated configuration. Further, since a separate space should be secured in order to mount the hall sensor, there is a limitation to the miniaturization of the portable terminal.

SUMMARY OF THE INVENTION

Accordingly, the present invention has been made to solve the above-mentioned problems occurring in the prior art, and it is an aspect of the present invention to provide a hinge apparatus for a portable terminal, which includes means for detecting open and closed states of a flip or folder.

In order to accomplish these aspects of the present invention, there is provided a hinge apparatus rotatably connecting a first housing and a second housing, the hinge apparatus including a first connection terminal mounted on the first housing; a second connection terminal mounted on the second housing; and a connection member straightly reciprocating between the first and second connection terminals while the second housing rotates with an electric connection with the second connection terminal, wherein the connection member makes contact with the first connection terminal when the second housing is folded to the first housing while facing the first housing, and the connection member also moves in a direction of being spaced apart from and withdrawing from the first connection terminal when the second housing rotates in a direction of withdrawing from the first housing.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF THE PREFERRED EMBODIMENT

Hereinafter, the preferred embodiment of the present invention will be described in detail with reference to the accompanying drawings. In the following description of the present invention, a detailed description of known functions and configurations incorporated herein is omitted for clarity and conciseness.

Figure 1:
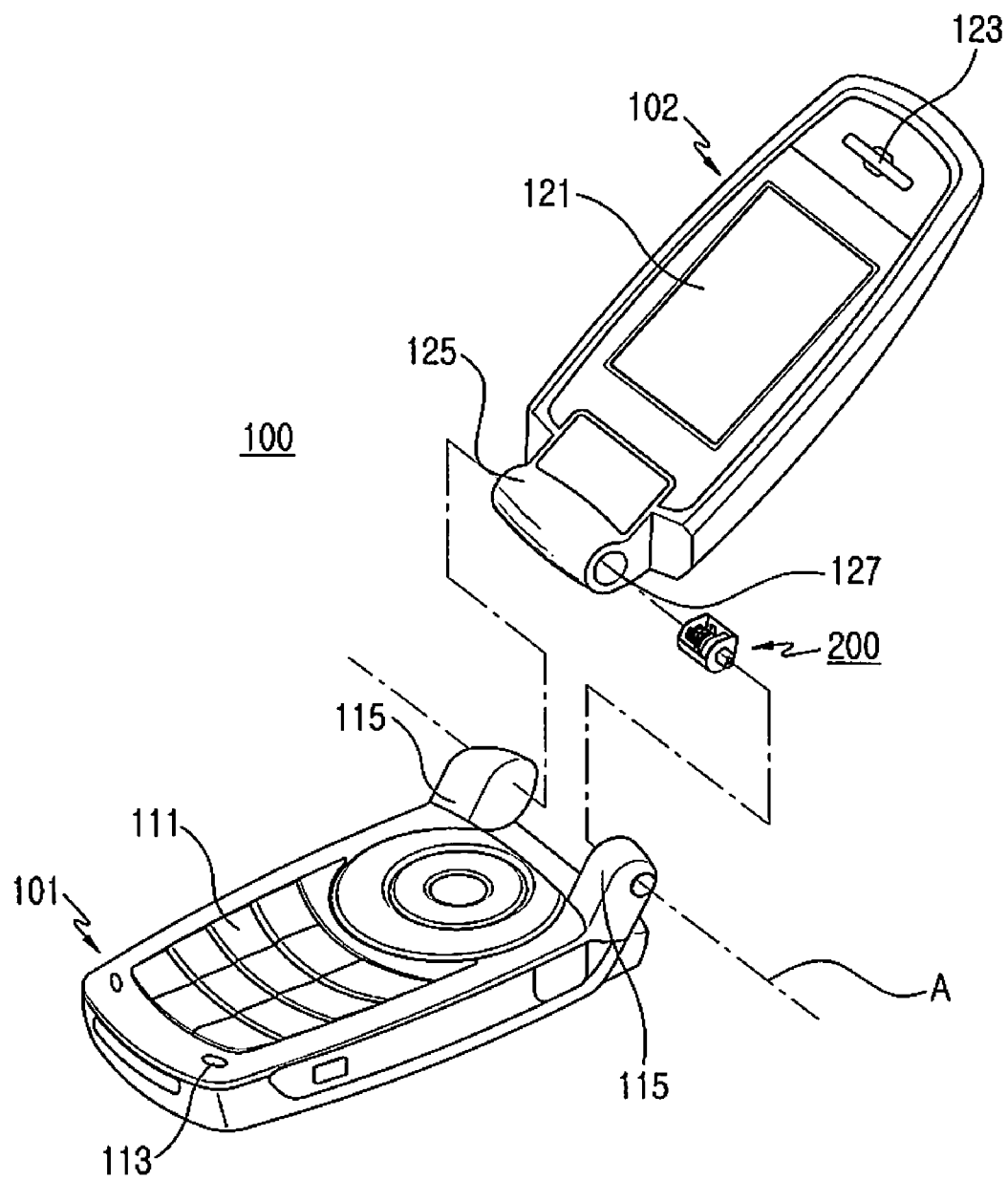
FIG. 1 is an exploded perspective view showing a portable terminal including a hinge apparatus according to the present invention.
Figure 2:
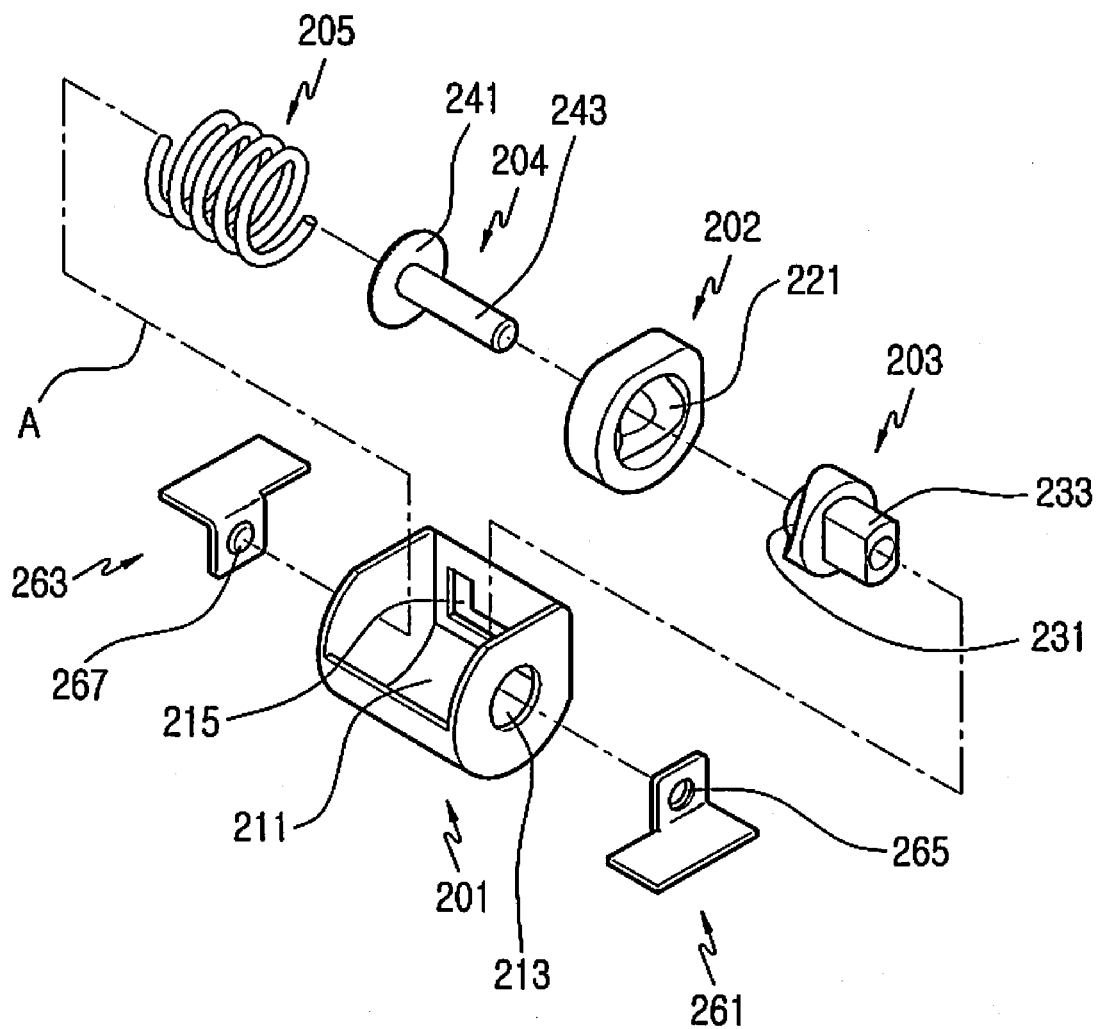
FIG. 2 is an exploded perspective view of the hinge apparatus for the portable terminal shown in FIG. 1.

FIG. 1 is an exploded perspective view showing a portable terminal 100 including a hinge apparatus 200 according to a preferred embodiment of the present invention, and FIG. 2 is an exploded perspective view showing the hinge apparatus 200.

The hinge apparatus 200 according to the present invention is applicable to both flip-type terminals and folder-type terminals. However, in the description of the detailed embodiment of the present invention, it will be understood that a folder-type portable terminal will be described as an example.

Referring to FIG. 1, the portable terminal 100 includes a first housing 101, and a second housing 102 rotatably coupled to the first housing 101 by the hinge apparatus 200. The second housing 102 rotates in a direction of approaching or withdrawing from the first housing 101 while facing the first housing 101.

The first housing 101 is provided with a keypad 111 and a transmitter 113 arranged on a surface thereof, which are open and closed as the second housing 102 rotates. In addition, a pair of side hinge arms 115 is formed facing each other at the upper portion on one surface of the first housing 101.

The second housing 102 is provided with a display unit 121 and a receiver 123 on a surface facing the first housing 101. The display unit 121 and the receiver 123 also are open and closed like the keypad 111 and the transmitter 113, as the second housing 102 rotates. The second housing 102 has a center hinge arm 125 formed at one end thereof, which is rotatably coupled with the side hinge arms 115. Thus, the portable terminal 100 has a hinge axis A, and the second housing 102 can rotate about the hinge axis A.

The center hinge arm 125 has a hinge hole 127 formed at one end thereof, which provides a space in which the hinge apparatus 200 is installed, and a hinge dummy (not shown) mounted on the other end thereof. The hinge apparatus 200 and the hinge dummy are respectively coupled with the side hinge arms 115. Specifically, the center hinge arm 125 is rotatably coupled with the side hinge arms 115 by means of the hinge apparatus 200 and the hinge dummy.

On the other hand, the side hinge arms 115 and the center hinge arm 125 have first and second connection terminals 261 and 263 mounted thereof, respectively, but are not shown in FIG. 1.

Referring to FIG. 2, the hinge apparatus 200 includes the first and second connection terminals 261 and 263, respectively, and a connection member 204 joined to the first and second connection terminals 261 and 263 so as the connection member 204 reciprocates between the first and second connection terminals 261 and 263. The connection member 204 is electrically connected to the second connection terminal 263, and is selectively connected to the first connection terminal 261 as the second housing 102 rotates.

In addition, in order to provide a driving force to rotate the second housing 102, the hinge apparatus 200 is provided with an elastic member 205, a hinge cam 202, a hinge shaft 203, and a hinge housing 201, which are assembled with one another as a module.

The hinge housing 201 has a cylindrical shape and extends in a direction of the hinge axis A. The hinge housing 201 has one end at which a thru-hole 213 is formed to allow a part of the hinge shaft 203 to extend through the thru-hole 213, and the other end which is closed. Further, the hinge housing 201 has an outer peripheral surface which is partially opened, and provides a space 211 in which the elastic member 205, the connection member 204, the hinge cam 202, and the hinge shaft 203 are sequentially assembled with one another. In the state that the elastic member 205, the connection member 204, the hinge cam 202, and the hinge shaft 203 are assembled, the hinge housing 201 is mounted in the hinge hole 127 of the center hinge arm 125.

The hinge cam 202 has a pair of mountain-shaped portions 221 formed to be symmetrical with respect to the hinge axis A, and a guide protrusion 223 (see FIG. 3) formed on an outer peripheral surface thereof. The hinge cam 202 reciprocates along the hinge axis A in the hinge housing 201. The hinge housing 201 has a guide groove 215 formed along the hinge axis A on an inner surface of the hinge housing 201. The guide protrusion 223 is received and straightly moves in the guide groove 215, so as to guide the straight movement of the hinge cam 202.

As the hinge housing 201 is mounted in the center hinge arm 125, the hinge housing 201 also rotates with respect to the first housing 101 when the second housing 102 rotates. Since the hinge cam 202 is also restricted in the hinge housing 201, the hinge cam 202 rotates along with the hinge housing 201 with respect to the first housing 101.

The hinge shaft 203 is rotatably received in the hinge housing 201, and has a hinge protrusion 233 formed at one end thereof. The hinge protrusion 233 extends along the hinge axis A and protrudes out of the hinge housing 201 through the thru-hole 213 of the hinge housing 201. In addition, when the hinge housing 201 is mounted in the center hinge arm 125, the hinge protrusion 233 protrudes out of one end of the center hinge arm 125 and is fixed to the side hinge arm 115. Hence, the hinge shaft 203 is fixed to the first housing 101, and the hinge housing 201 and the hinge cam 202 can rotate along with the second housing 102 with respect to the first housing 101.

The hinge shaft 203 has a pair of valley-shaped portions 231 formed at the other end thereof to correspond to the mountain-shaped portions 221 of the hinge cam 202. When the mountain-shaped portions are engaged with the valley-shaped portions 231, the first and second housings 101 and 102 are folded.

The elastic member 205 has one end supported by an inner wall of the hinge housing 201 and the other end supported by the hinge cam 202, so as to provide elasticity which forces the hinge cam 202 to come into close contact with the hinge shaft 203. Therefore, when the mountain-shaped portions 221 withdraw from the valley-shaped portions 231, the elasticity of the elastic member 205 makes the hinge cam 202 move toward and come into close contact with the hinge shaft 203. Hence, the hinge shaft 203 rotates in a direction where the mountain-shaped portions 221 are engaged with the valley-shaped portions 231 in the hinge housing 201. Specifically, when the apexes of the mountain-shaped portions 221 are located on the incline surfaces of the valley-shaped portions 231, the hinge cam 202 moves in a direction of coming into close contact with the hinge shaft 203, while the hinge shaft 203 rotates in a direction that the lowest points of the valley-shaped portions 231 are engaged with the apexes of the mountain-shaped portions 221.

On the other hand, the first and second connection terminals 261 and 263 are mounted on the first and second housings 101 and 102, respectively, and face both ends of the hinge housing 201. Particularly, the first connection terminal 261 is mounted in the side hinge arm 115 of the first housing 101 and faces an end of the hinge protrusion 233. The second connection terminal 263 is mounted in the center hinge arm 125 and comes into contact with the hinge housing 201. The first and second connection terminals 261 and 263 have contact protrusions 265 and 267 formed thereon to protrude toward the hinge protrusion 233 and the hinge housing 201, respectively.

The first and second connection terminals 261 and 263 are connected to circuit devices in the first and second housings 101 and 102, respectively.

The connection member 204 includes a support plate 241 and a connecting rod 243 extending from a surface of the support plate 241. The support plate 241 is supported by the other end of the hinge cam 202 and is disposed between the elastic member 205 and the hinge cam 202. The connecting rod 243 extends in a direction of the hinge axis A, and sequentially extends through the hinge cam 202 and the hinge shaft 203.

As the support plate 241 is supported by the other end of the hinge cam 202, the support plate 241 and the connecting rod 243 are also straightly moved in the hinge housing 201 when the hinge cam 202 straightly moves in the hinge housing 201. At this time, the distal end of the connecting rod 243 is located adjacent to the first connection terminal 261, and appears and disappears through end of the hinge protrusion 233 so as to selectively connect with the first connection terminal 261, and more particularly the connection protrusion 265 of the first connection terminal 261.

If the contacts between the first connection terminal 261 and the connecting rod 243, and the second connection terminal 263 and the hinge housing 201 can be stably maintained, the connection protrusions 265 and 267 need not be formed.

The hinge housing 201 and the elastic member 205 are made of conductive material in order to maintain the electric contact of the connection member 204 with the second connection terminal 263. In other words, the support plate 241 is electrically connected to the second connection terminal 263 through the elastic member 205 and the hinge housing 201. In addition, in order to maintain the intermittent connection of the first connection terminal 261 and the connection member 204, at least the hinge shaft 203 is preferably made of synthetic resin, which is an electrical insulation material. Since the hinge shaft 203 is made of the electrical insulation material, the first connection terminal 261 is maintained to be spaced apart from the hinge housing 201.

Figure 3:
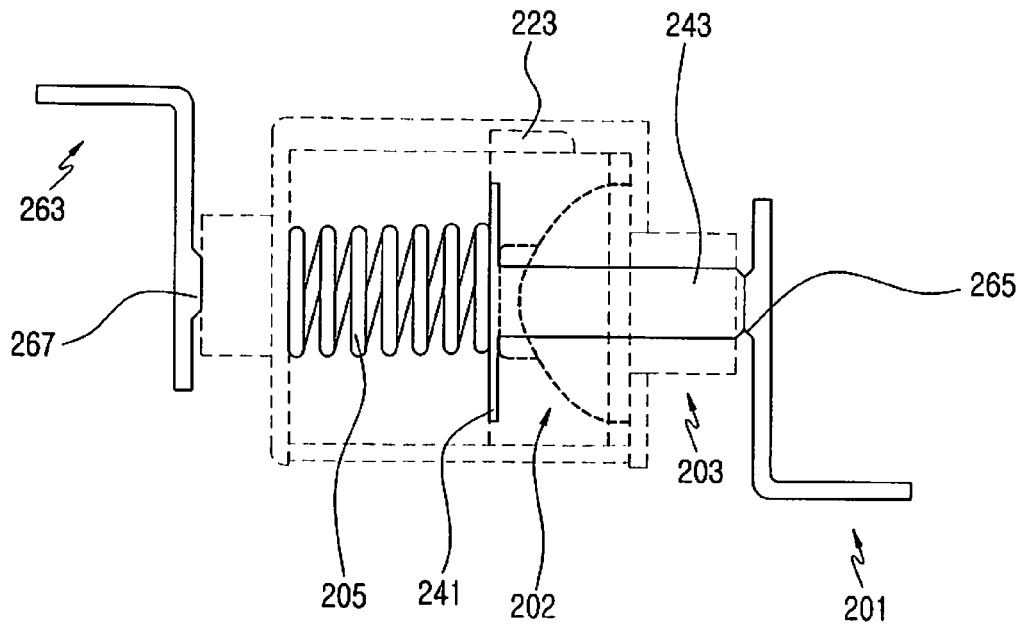
FIG. 3 is a view showing a configuration of the hinge apparatus for the portable terminal shown in FIG. 1, in which the hinge apparatus is assembled.
Figure 4:
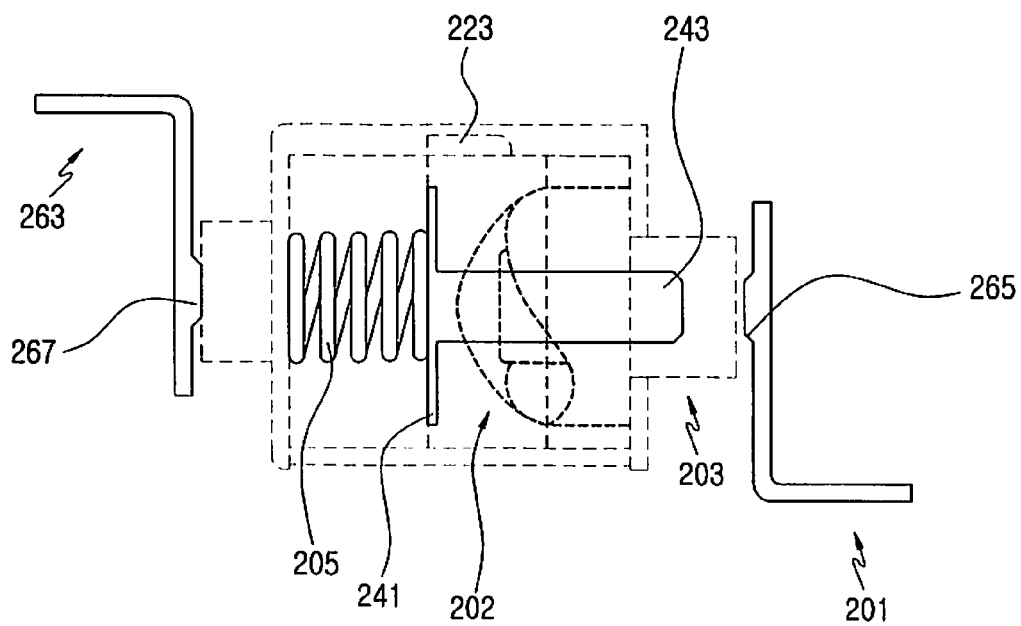
FIGS. 4 to 6 are views sequentially showing the hinge apparatus for the portable terminal shown in FIG. 3, in which a hinge shaft rotates.
Figure 5:
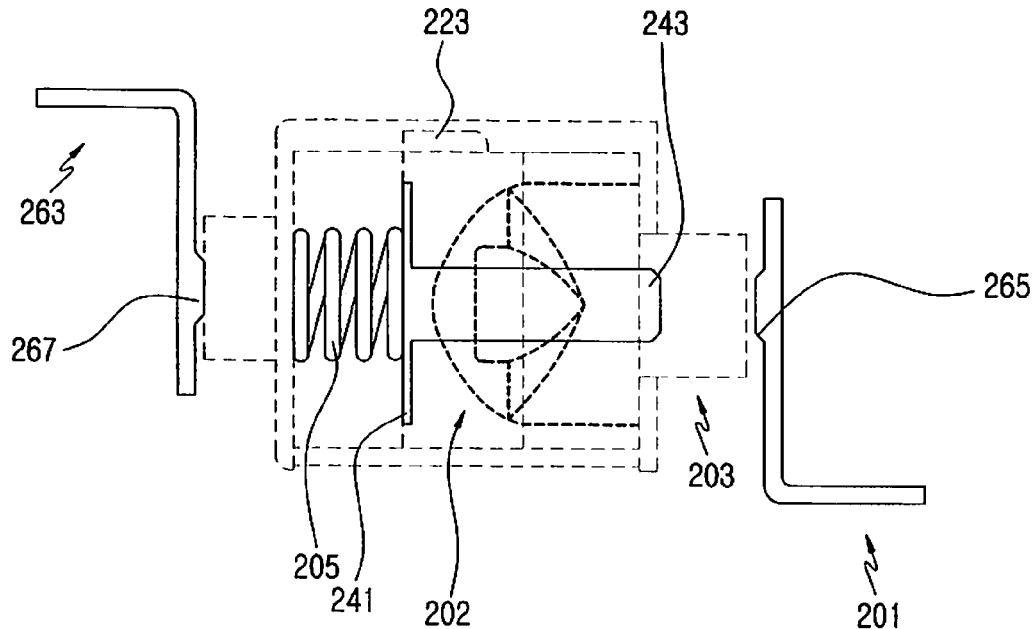
Figure 6:
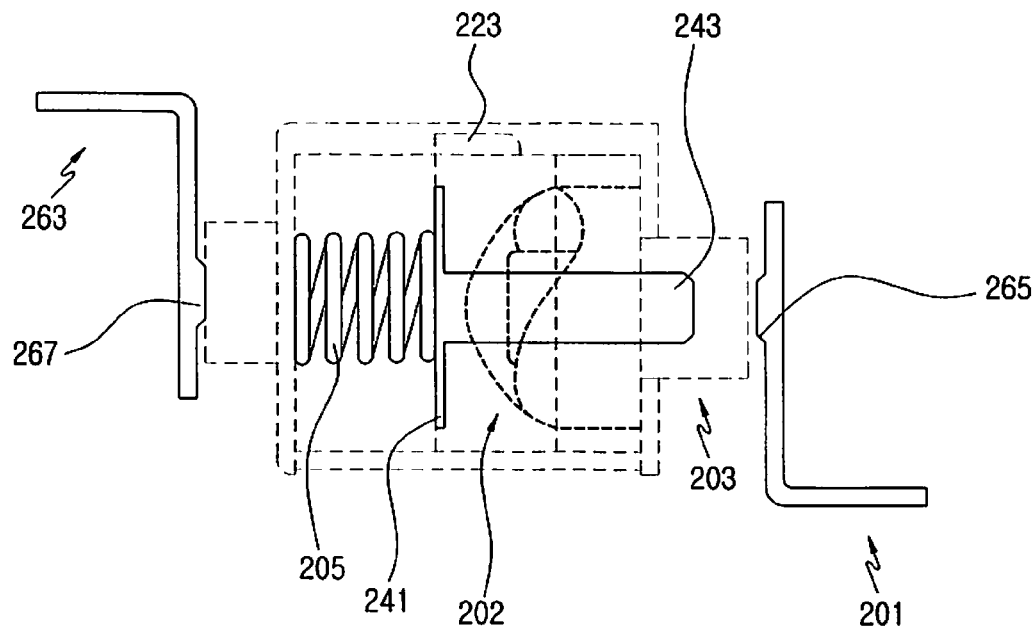

FIG. 3 is a view showing a configuration of the hinge apparatus for the portable terminal shown in FIG. 1, in which the hinge apparatus is assembled, and FIGS. 4 to 6 are views sequentially showing the hinge apparatus for the portable terminal shown in FIG. 3, in which a hinge shaft rotates. Furthermore, FIG. 3 shows the hinge apparatus 200 when the first and second housings 101 and 102 are folded, and FIGS. 4 to 6 sequentially show the hinge apparatus 200 when the second housing 102 is opened at angles of 45 degrees, 90 degrees, and 150 degrees.

Referring to FIG. 3, when the first and second housings 101 and 102 are folded, the hinge cam 202 comes into close contact with the hinge shaft 203. Specifically, the mountain-shaped portions 221 and the valley-shaped portions 231 are completely engaged with one another. At this time, the connection member 204 moves in a direction to the hinge shaft 203 toward the first connection terminal 261, and the end of the connecting rod 243 protrudes through the end of the hinge protrusion 233 and comes into contact with the first connection terminal 261. Accordingly, the first and second connection terminals 261 and 263 are electrically connected with each other, and the portable terminal can detect the state in which the first and second housings 101 and 102 are folded.

When the second housing 102 rotates in a direction of moving apart from the first housing 101 more and more, the connection member 204 moves along with the hinge cam 202 in a direction of keeping the hinge shaft 203 apart from the first connection terminal 261. At this time, since the hinge shaft 203 is fixed to the first housing 101, the hinge shaft 203 rotates with respect to the hinge housing 201.

As the connection member 204 moves and keeps apart from the hinge shaft 203 more and more, the end of the connecting rod 243 is also spaced from the first connection terminal 261 and moves into the hinge shaft 203 in a direction away from the first connection terminal 261. Thus, the electric connection of the first and second connection terminals 261 and 263 is interrupted, and thereby the portable terminal 100 can detect that the first and second housings 101 and 102 are open.

Referring to FIG. 5, when the second housing 102 is open by an angle of 90 degrees with respect to the first housing 101, the apexes of the mountain-shaped portions reach the highest points of the valley-shaped portions 231. When the second housing 102 rotates in a range of an angle less than 90 degrees in the direction of being folded to the first housing 101, the apexes of the mountain-shaped portions 221 are located between the lowest points and the highest points of the valley portions 231, and the hinge apparatus 200 generates driving force to enable the second housing 102 to approach the first housing 101.

In addition, when the second housing 102 rotates to angle exceeding 90 degrees away from the first housing 101, the apexes of the mountain-shaped portions 221 are located between the lowest points and the highest points of the valley-shaped portions 231, and the hinge apparatus 200 generates driving force to enable the second housing 102 to rotate in a direction farther from the first housing 101.

At this time, the second housing 102 may be open to an angle of 150 degrees from the first housing 101. The connection member moves in a direction of connecting with the first connection terminal while the second housing 102 rotates to an angle of 150 degrees. However, since the second housing 102 cannot rotate after being open to an angle of 150 degrees with respect to the first housing 101, the end of the connecting rod 243 does not protrude out of the end of the hinge protrusion 233. Thereby, the portable terminal 100 can detect that the second housing maintains its open state.

As described above, the hinge apparatus for the portable terminal according to the present invention has a configuration in which the connection terminals are mounted in the pair of housings, respectively, and are selectively connected with each other by using the connection member straightly moving between the connection terminals, thereby detecting the open or closed state of the folder-type portable terminal. Accordingly, it is possible to detect the open and closed state of the folder-type portable terminal without installation of a separate hall sensor, thereby simplifying the configuration of the circuit device. Furthermore, it is possible to reduce the mounting space for parts, thereby realizing the miniaturization of the portable terminal.

The hinge apparatus 200 according to the present invention has a configuration in which the connection of the connecting rod 243 and the first connection terminal 261 is interrupted before the second housing is open by an angle of about 45 degrees, and the portable terminal 100 can detect the open state of the second housing. However, if the length of the connecting rod 243 is elongated in order to secure the portion of the connecting rod 243 protruding through the end of the hinge protrusion 233, and at the same time, the first connection terminal 261 is made of an elastic plate accumulating elasticity which enables the first connection terminal 261 prolonged electrical contact with the end of the hinge protrusion 233, it is possible to set a time point at which the portable terminal 100 detects the open state of the first and second housings 101 and 102 when the second housing 102 is open at an angle more than 45 degrees with respect to the first housing 101.

Specifically, if the connecting rod 243 has a sufficient length, the end of the connecting rod 243 is kept in the state of protruding through the end of the hinge protrusion 233, as shown in FIG. 4. Thus, it is possible to adjust a time point when the electrical connection of the connecting rod 243 and the first connection terminal 261 is interrupted. However, it is noted that at the point when the second housing 102 is completely open, such as at about 150 degrees, the length of the connecting rod 243 should be restricted so that the end of the connecting rod 243 is prevented from electrically connecting with the first connection terminal 261.

Further, in the present invention, it is described that the hinge housing 201 and the hinge shaft 203 are fixed to the second housing and the first housing 101, respectively. However, the hinge housing 201 may be mounted on the first housing, and the hinge shaft 203 may be fixed to the second housing according to products.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A hinge apparatus for a portable terminal including a first housing and a second housing rotatably connected to the first housing, the hinge apparatus comprising:
    a first connection terminal mounted on the first housing;
    a second connection terminal mounted on the second housing,
    a connection member electrically connected to the second connection terminal and reciprocating between the first and second connection terminals,
    wherein the connection member extends to make an electrical contact with the first connection terminal when the second housing is folded to the first housing by rotation about a hinge axis, and the connection member disrupts the electrical contact when the second housing is unfolded from the first housing; and
    a hinge housing mounted on the second housing, a hinge cam movably received in the hinge housing, and a hinge shaft rotatably received in the hinge housing while facing the hinge cam, wherein the connection member is supported by a first end of the hinge cam as the connection member moves along with the hinge cam,
    wherein the hinge cam has a plurality of mountain-shaped portions formed on a first surface of the hinge cam, the hinge shaft has a plurality of valley-shaped portions formed on a second surface of the hinge shaft, the first surface faces the second surface, and the mountain-shaped portions and the valley-shaped portions are engaged with one another so that the connection member makes electrical contact with the first connection terminal when the second housing is folded to the first housing, and the mountain-shaped portions withdraw from the valley-shaped portions so that the connection member disrupts the electrical contact when the second housing is unfolded from the first housing.

2. The hinge apparatus as claimed in claim 1, further comprising an elastic member enabling the connection member to move toward the first connection terminal.

3. The hinge apparatus as claimed in claim 1, wherein the hinge shaft further comprises a hinge protrusion extending from one end of the hinge shaft and protruding through one end of the hinge housing, wherein the hinge protrusion is fixed to the first housing and faces the first connection terminal.

4. The hinge apparatus as claimed in claim 1 further comprising an elastic member having one end supported by an inner surface of the hinge housing and an other end supported by the connection member, wherein the elastic member provides elasticity to force the hinge cam to come into close contact with the hinge shaft.

5. The hinge apparatus as claimed in claim 1, wherein the connection member includes a supporting plate supported by the first end of the hinge cam and a connecting rod extending from a surface of the supporting plate, the connecting rod sequentially extending through the hinge cam and the hinge shaft and having a distal end adjacent to the first connection terminal.

6. The hinge apparatus as claimed in claim 5, further comprising an elastic member having one end supported by an inner surface of the hinge housing, and an other end supported by the supporting plate, wherein the supporting plate is electrically connected to the second connection terminal through the elastic member and the hinge housing, and the connecting rod is selectively electrically connected to the first connection terminal as the hinge cam moves.

7. The hinge apparatus as claimed in claim 5, further comprising a connection protrusion provided on the first connection terminal and protruding toward the hinge shaft, wherein the distal end of the connecting rod comes into selective contact with the connection protrusion.

8. The hinge apparatus as claimed in claim 1, further comprising an elastic member which has one end supported by an inner surface of the hinge housing and another end supported by the connection member, so as the elastic member provides elasticity to force the hinge cam to come into close contact with the hinge shaft.

9. The hinge apparatus as claimed in claim 1 wherein the hinge housing further comprises a guide groove longitudinally extending on an inner peripheral surface of the hinge housing and parallel with the hinge axis, and a guide protrusion protruding from an outer peripheral surface of the hinge cam and received in the guide groove, wherein the guide protrusion moves along the hinge axis in the guide groove so as to guide a straight movement of the hinge cam.

10. The hinge apparatus as claimed in claim 1 further comprising a connection protrusion protruding on a surface of the second connection terminal, wherein the connection protrusion comes into contact with an end of the hinge housing.

11. The hinge apparatus as claimed in claim 1, further comprising a hinge housing mounted on the second housing and maintaining an electrical connection with the second connection terminal, and an elastic member having one end supported by an inner surface of the hinge housing and an other end supported by the connection member, so as the elastic member provides elasticity to force the connection member to make the electrical contact.

12. The hinge apparatus as claimed in claim 11, wherein the connection member includes a supporting plate supported by one end of the hinge cam, and a connecting rod extending from the supporting plate, wherein a distal end of the connecting rod protruding through one end of the hinge housing and being located adjacent to the first connection terminal.

* * * * *